United States Patent [19]

Baracat et al.

[11] Patent Number: 5,038,400
[45] Date of Patent: Aug. 6, 1991

[54] CARRY HOLDER FOR AN ELECTRONIC DEVICE

[75] Inventors: Frederick A. Baracat, Coral Springs; Stanley A. Yeager, Jr., Plantation, both of Fla.

[73] Assignee: Motorola, Inc., Schaumburg, Ill.

[21] Appl. No.: 593,583

[22] Filed: Oct. 9, 1990

Related U.S. Application Data

[63] Continuation of Ser. No. 401,677, Sep. 1, 1989, abandoned.

[51] Int. Cl.⁵ .......................... H04B 1/08; H04B 1/38
[52] U.S. Cl. ...................................... 455/90; 455/347; 455/349
[58] Field of Search ............ 455/89, 90, 343, 347–349, 455/351, 350

[56] References Cited

U.S. PATENT DOCUMENTS

| | | | |
|---|---|---|---|
| 3,720,874 | 3/1973 | Gorcik et al. | 455/347 |
| 4,039,999 | 8/1977 | Weston | 455/89 |
| 4,214,197 | 7/1980 | Mann et al. | 455/89 |
| 4,325,142 | 4/1982 | Nakazawa | 455/89 |
| 4,336,537 | 6/1982 | Strickland | 455/89 |
| 4,340,972 | 7/1982 | Heist | 455/89 |
| 4,412,106 | 10/1983 | Pavel | 455/89 |
| 4,456,797 | 6/1984 | Olsen | 381/25 |
| 4,485,946 | 12/1984 | Liautaud et al. | 455/90 |
| 4,792,986 | 12/1988 | Carner et al. | 455/89 |
| 4,858,798 | 8/1989 | Siddoway et al. | 455/90 |

Primary Examiner—Reinhard J. Eisenzopf
Assistant Examiner—Lisa Charouel
Attorney, Agent, or Firm—Robert S. Babayi

[57] ABSTRACT

According to the invention, a carry holder for carrying a portable two-way radio provides the interconnections between the portable radio and a accessory device. The carry holder provides the interconnection between the portable radio's universal connector and the accessory device's accessory connector. When the radio is placed in the carry holder, the radio's universal connector engages the carry holder, which is coupled to the accessory device. Therefore, a quick engagement and disengagement mechanism for the radio and the accessory device is provided.

9 Claims, 2 Drawing Sheets

CARRY HOLDER FOR AN ELECTRONIC DEVICE

This is a continuation of application Ser. No. 07/401,677 filed on Sept. 1, 1989 and now abandoned.

TECHNICAL FIELD

This invention relates generally to the field of electronic accessories, in particular to an arrangement for engaging an accessory device to a portable radio through a carry holder.

BACKGROUND

Presently, electronic devices, such as portable radios, are extensively used by many users, such as Policemen, and fire fighters, and they rely heavily upon them for performing their daily tasks. Specifically, a user continuously interacts with the portable radio by speaking into a microphone, or by pressing a push-to-talk button (PTT), or by listening to a speaker during transmission or reception. Therefore, it is an important concern of the manufacturers to facilitate the use of such electronic devices.

A portable radio may be carried by the user, or it may be transported by placing it in a vehicular adaptor. Generally, one of the convenient methods for carrying the radio is to place it in a carry holder. The carry holder includes a pocket for holding the portable radio, and it may be attached to the user by an attachment means. Subsequently, the radio may easily be taken out, when interaction with the radio is required. Accordingly, accessory devices may be used for ease of interaction. The accessory device extends radio's interaction elements, such as microphone, speaker, antenna, and push-to-talk button to provide a convenient interaction with the radio.

Presently, when the portable radio is being carried by the user, the accessory device and the radio are interconnected through a mating mechanism, which may include a screw for screwing the accessory device to a threaded insert on the portable radio. In this arrangement, a number of contacts on a radio universal connector present the proper interaction signals, such as PTT and audio signals, to corresponding contacts on a accessory device connector. Generally, an aligning mechanisms for the universal connector and the accessory device contacts is provided.

Additionally, an accessory device may connect to a radio via a vehicular adapter when the radio is transported in a car. The vehicular adapter may provide additional features, such as a battery charger, a power amplifiers, etc. In this arrangement, the accessory device is connected to the vehicular adapter through an accessory connector located inside the vehicular adapter. Operationally, the radio is inserted into a pocket on the vehicular adapter, and engages the accessory connector either automatically, or by manual actuation. Conversely, the radio may quickly be disengaged from the vehicular adaptor by pressing a button or another manual actuation. When engaged, a biasing mechanism in the vehicular adaptor maintains the connections between the vehicular adapter's accessory connector and the radio's universal connector.

In practice, when carrying the radio, it may be desirable or even necessary to engage and disengage the radio and the accessory device more quickly and conveniently. It will be appreciated that, engaging and/or disengaging the radio and the accessory device by an screw is cumbersome and time consuming. Additionally, the accessory device connectors are usually bulky, and may provide inconvenient when the portable radio is in use. Therefore, it is desirable to provide a more convenient arrangement for engaging or disengaging the portable radio to an accessory device.

SUMMARY OF THE INVENTION

Accordingly, it is an object of the present invention to provide a convenient arrangement for engaging and/or disengaging a portable radio to an accessory device.

Briefly, according to the invention, a carry holder provides the interconnection between the portable radio and the accessory device. The carry holder includes housing means for receiving the radio, and a connection means for connecting a radio connector to an accessory device.

DETAILED DESCRIPTION OF THE PREFERRED EMBODIMENT

Figure 1:
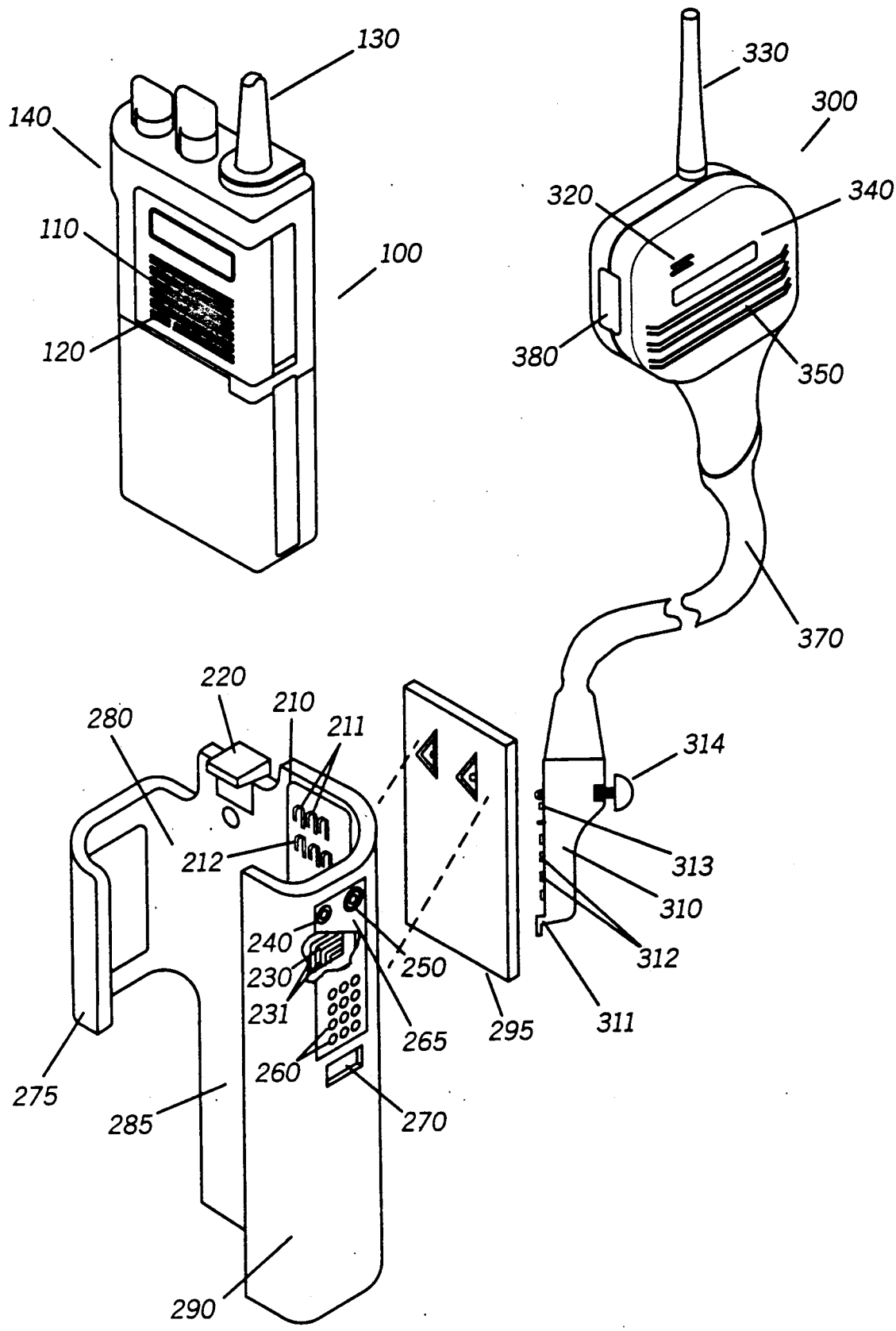
FIG. 1 is an illustration of the carry holder of present invention as utilized in conjunction with a portable radio and an accessory device.

Referring to FIG. 1, a preferred carry holder 200 for carrying a radio 100 by a user is shown. The carry holder 200 is attached to the user by an attachment means, such as a belt clip 295. Upon inserting the radio into the carry holder, the user may externally interact with the radio 100 via an accessory device 300.

The radio 100 is a well known microprocessor controlled transceiver device, used for two-way radio frequency (RF) communication with other communication devices, such as a base station. The user may interact with the radio through its' internal interaction means (i.e. microphone, speaker, internal PTT), or through external interaction means on the external accessory device 300. The radio 100 is capable of receiving voice through an internal microphone 120, and delivering a modulated RF signal to an internal antenna 130 for transmission. The transmitter of the radio 100 is activated by a PTT signal generated when pressing an internal PTT switch 140. Accordingly, the radio 100 is capable of receiving a modulated RF signal through the antenna 130, and delivering a demodulated audio signal to an internal speaker 110. Accordingly for clarity, the signals associated with the internal microphone 120, the internal speaker 110, the internal PTT 140, and the internal antenna RF signals are collectively called the internal interaction signals. If desired, other external interaction means such as key pads and displays may be provided.

When external interaction with the radio is required, the internal interaction signals must be switched to the external interaction means on the accessory device 300. It is well known in the art that such switching occurs, when the radio 100 detects an accessory control signal from the accessory device 100. Such an accessory control signal may comprise a ground potential applied to the radio 100, when the accessory device 300 is coupled. The accessory device 300 comprises an accessory holder 340, which is coupled to an accessory connector 310 through a cable 370. The accessory holder 340 carries the external interaction means, such as an external speaker 350, an external microphone 320, an external antenna 330, and an external PTT 380.

Figure 2:
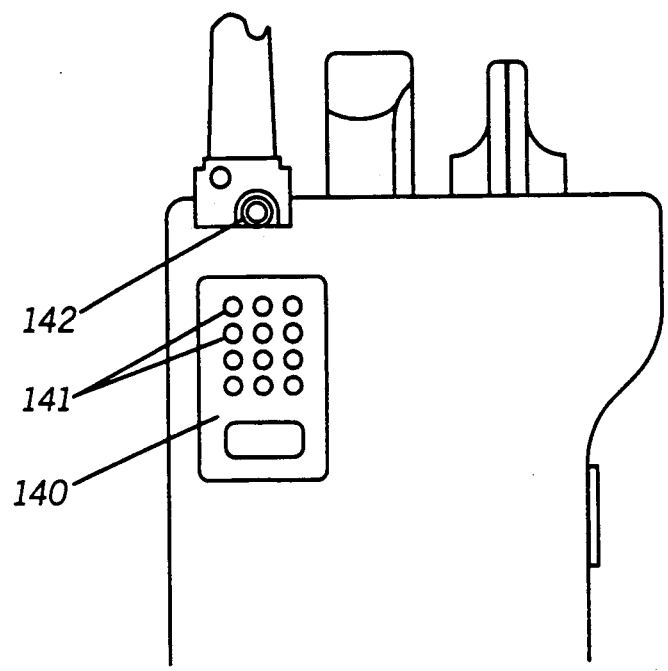
FIG. 2 is an illustration of the universal connector of the portable radio of FIG. 1.

Referring to FIG. 2, a radio universal connector 140, positioned on the back of the radio 100, includes a number of accessory contacts 141, and an RF contact 142. The universal connector 140 provides the connection port for receiving and delivering signals from and to the radio 100. The signals present at contacts 141 may comprise the interaction signals, and may even include data signals for sending and receiving commands from an internal or an external microprocessor. Additionally the RF contact 142 provides for transfer of the received or transmit RF signals from and to the radio 100.

According to the invention, the user may interact with the radio 100 externally, only when the radio is carried inside the carry holder 200. In the preferred embodiment of the invention, the carry holder 200 is made of a molded polyurethane plastic material. The carry holder 200 comprises a back wall 285 being extended from each side to form surrounding walls 275 and 290. The surrounding walls are shaped, such that they form, in conjunction with the back wall 285, a housing means or a pocket 280 for receiving the radio 100. The back wall 285 includes on its inner side a first universal connector 210 positioned such that it engages the radio universal connector 140, when the radio 100 is in the carry holder 200. The back wall 285 includes the belt clip 295, on its outer side, to provide attachment means for attaching the carry holder 200 to the user.

Figure 3:
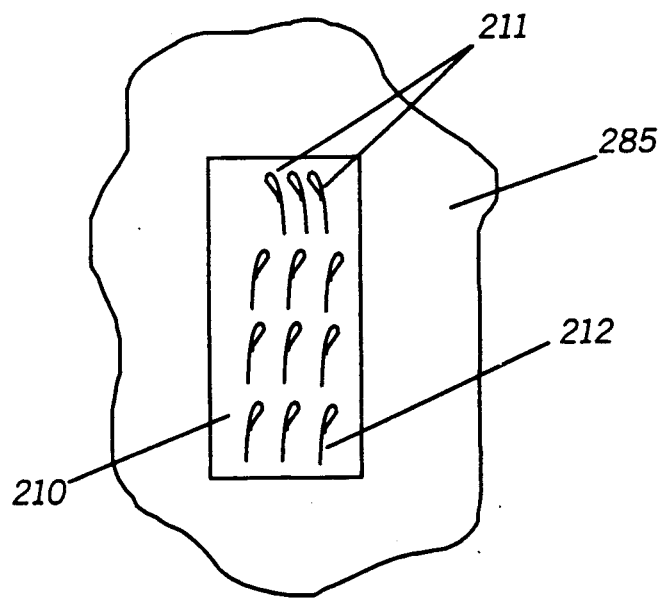
FIG. 3 is is an illustration of the universal connector of the carry holder of the present invention.

Referring to FIG. 3, a portion of back wall 285, which includes the first universal connector 210 is shown. The first universal connector 210 includes a number of spring contacts 211 and a RF spring contact 212. These contacts are arranged such that they provide substantial point to point connection with radio contacts 141 and 142, when the radio 100 is inside the carry holder 200. That is, RF spring contacts 211 connect to the radio RF contact 142, and the spring contacts 212 connects to the corresponding radio contacts 141. In the preferred embodiment of the invention, the first universal connector 210 is made of plastic material, and is bonded to the carry holder 200 by any suitable bonding technique.

Referring back to FIG. 1, when the radio 100 is carried inside the carry holder 200, the shape of the pocket 280 and the resiliency provided by the plastic material produce a substantially tight fit, and prevent radio movement. The carry holder 200 includes a clip 220 constituting latching means, which provides a locking mechanism for the radio, and further prevents radio movement. Once the radio is inserted into the pocket 280, the first universal connector 210 engages to the radio universal connector 140, and the tight fit of the arrangement substantially secures the point to point connections between all the contacts. Moreover, the point to point connection integrity is substantially increased by the spring contacts 211 of the universal connector pressing against the radio contacts 141. Accordingly, the RF spring contacts 211 make substantial contact with radio RF contacts 142.

The connections of the the first universal connector 210 extends to a second universal connector 265 positioned on the outer side of the surrounding wall 290. The second universal connector 265 includes a number of contacts 260 and an RF contact 250, which are extensions of the corresponding the contacts 211 and the RF contact 212. In FIG. 1, a portion of the surrounding wall 290 is removed to show the arrangement by which a flexible circuit 230, via conductive runners 231, provides interconnection between the first universal connector 210 and the second universal connector 265. In the preferred embodiment of the invention, the flexible circuit 230 is inserted, or sandwiched between inner layer and outer layer of The surrounding wall 290 and the back wall 285.

The accessory device 300 is coupled to the carry holder 200 through the accessory connector 310. The accessory connector 310 includes contact pins 312, and RF pin 313, which are coupled to the contact pins 260 and the RF contact 250, when the accessory connector 310 is attached to the carry holder 200. The accessory connector 310 attaches to the carry holder 200 by engaging a tab 311 to a groove 270, and screwing a screw 314 into a threaded insert 240 on the carry holder 200.

Accordingly, the carry holder 200 provides an efficient mechanism for quick engagement and/or disengagement of a radio to an accessory device. One of ordinary skill in the art appreciates that, The accessory connector may be an integral part of the carry holder 200 or an extension thereof. Therefore, in this arrangement, no attachment mechanism between the carry holder 200 and the carry holder is required. Additionally, the present invention allows for providing a generic accessory device for different radio models. This may be accomplished because, the second universal connector 265 may be designed to accommodate the generic accessory device, and the first universal connector may be designed to accommodate different models of radios. Accordingly, it will also be appreciated by one of ordinary skill in the art that there are other variations in implementing the above arrangement without deviating from the true scope of the present invention.

What is claimed is:

1. A carrying device for carrying a portable radio unit having radio circuitry disposed within a radio housing, wherein said radio circuitry is accessible through a universal connector positioned on said radio housing, said carrying device comprising:

carrying device housing means for receiving said portable radio unit, and connection means for providing electrical interconnection between at least a portion of the radio circuitry within said portable radio unit and another device or circuitry when said portable radio unit is positioned within said carrying device; said connection means including electrical contact means positioned on said carrying device housing means for engaging to said universal connector when said portable radio unit is inserted in to said carrying device housing means.

2. The carrying device of claim 1, wherein said means for receiving includes attachment means for attaching said carry holder to said user.

3. The carrying device of claim 1, wherein said means for receiving said radio further includes latching means for securing said portable radio unit.

4. The carrying device of claim 2, wherein said attachment means comprise a belt clip.

5. The carrying device of claim 1, wherein said another device comprises an accessory device for said portable radio.

6. The carrying device of claim 5, wherein said accessory device includes a microphone.

7. The carrying device of claim 5, wherein said accessory device includes a speaker.

8. The carrying device of claim 5, wherein said accessory device includes an antenna.

9. The carry holder of claim 1, wherein said connection means includes a flexible film having conductive runners disposed thereon for providing said electrical interconnections between radio circuitry and said other device or circuitry.

* * * * *